Figure 5:
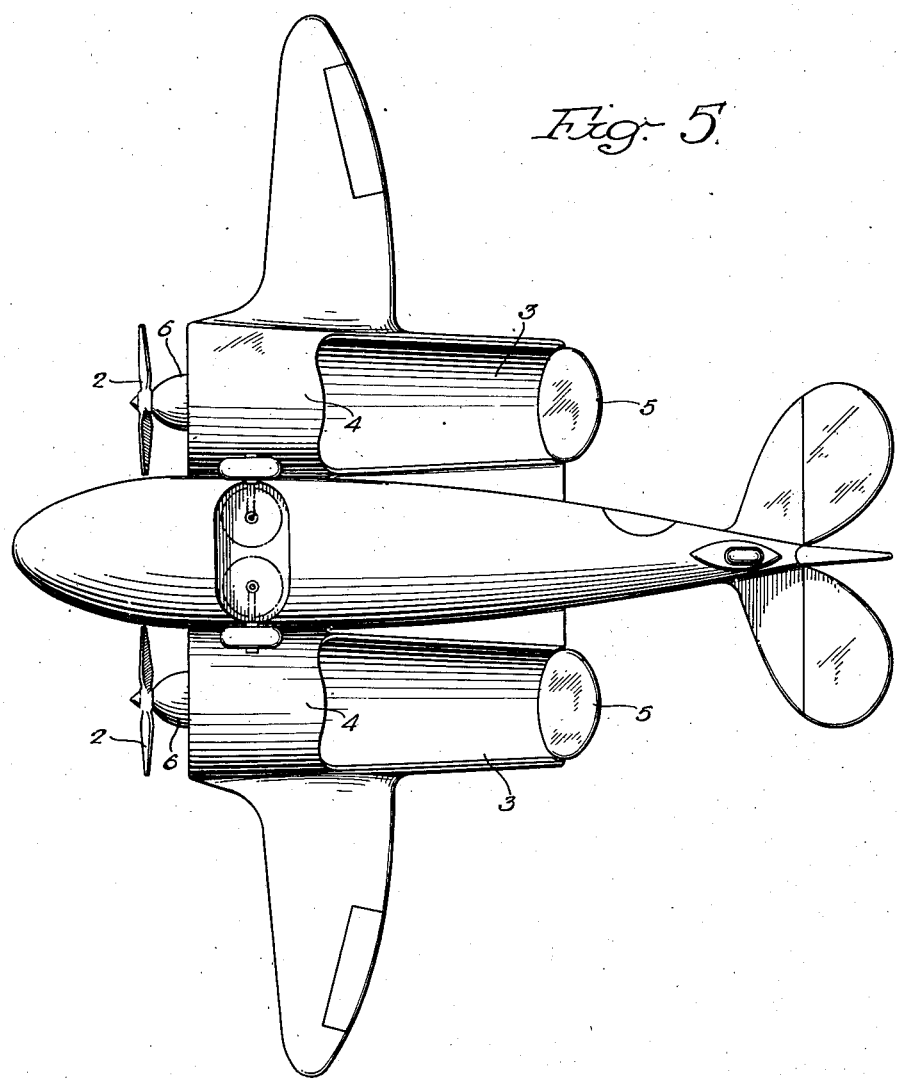

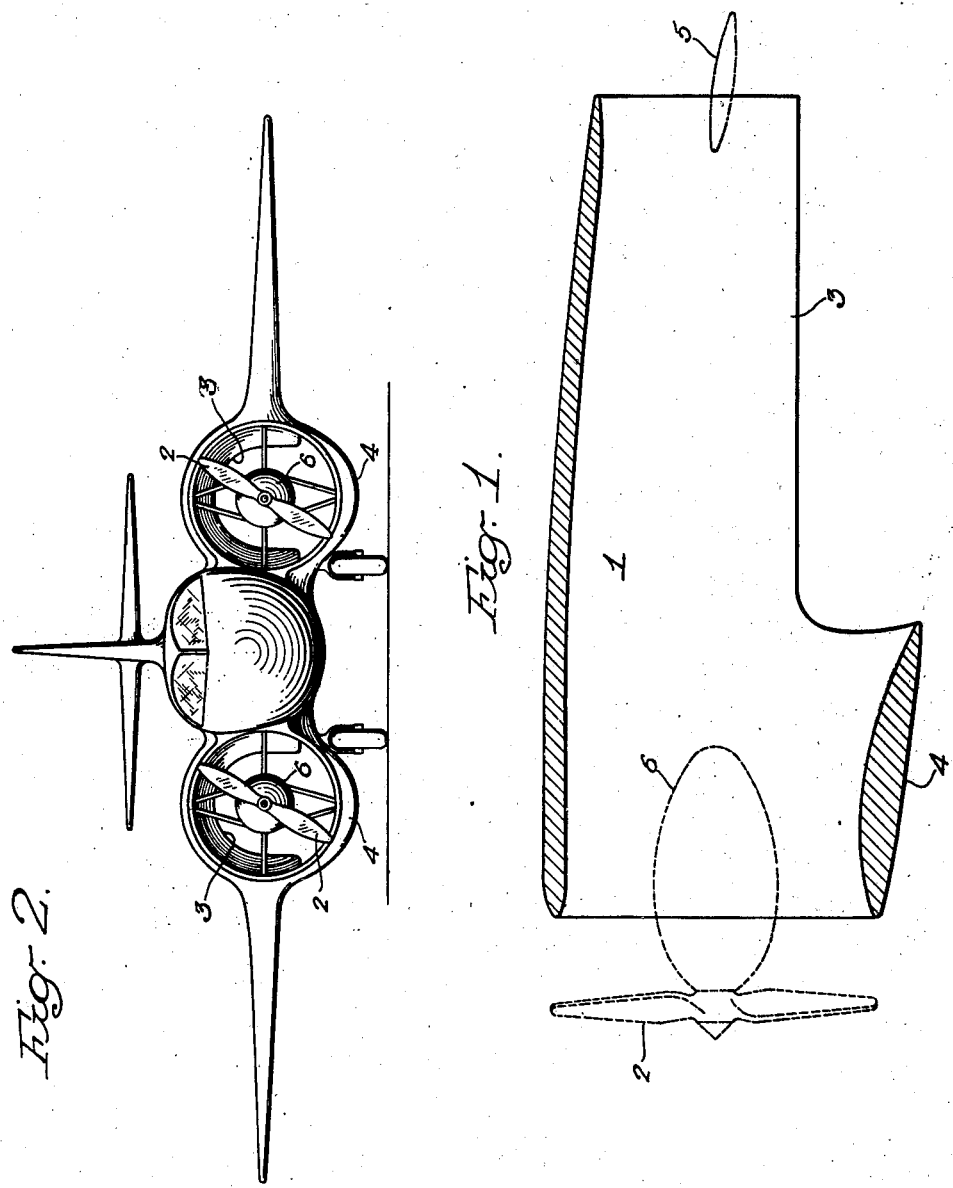

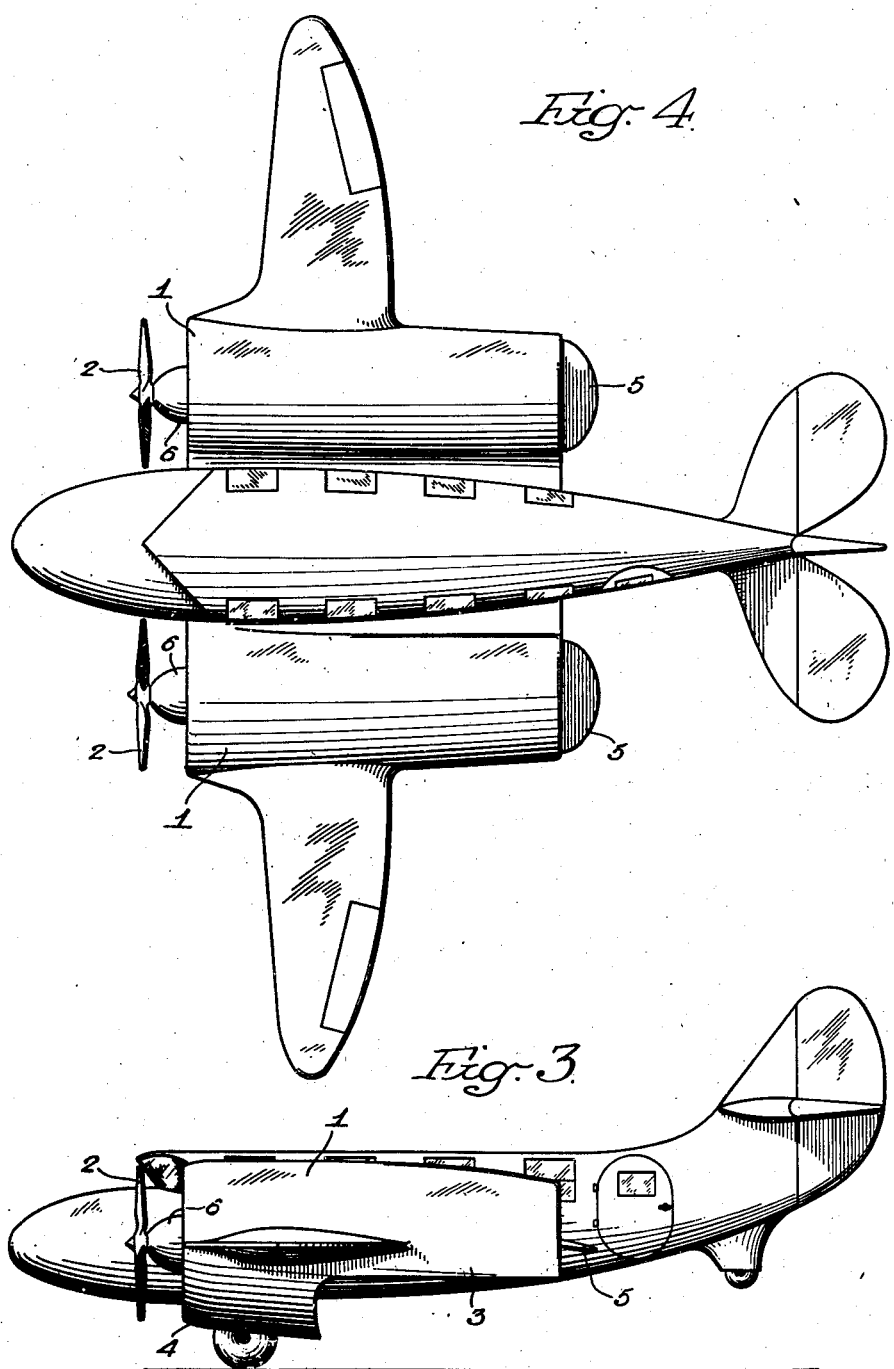

May 24, 1938.  R. K. ODOR  2,118,052
PROPELLER ASSEMBLY FOR AIRCRAFT
Filed July 31, 1934   3 Sheets-Sheet 3

Patented May 24, 1938

2,118,052

UNITED STATES PATENT OFFICE 2,118,052

PROPELLER ASSEMBLY FOR AIRCRAFT

Ralph K. Odor, Edmond, Okla.

Application July 31, 1934, Serial No. 737,844

13 Claims. (Cl. 244—15)

The principal object of this invention is to provide a novel air propeller assembly affording increased propeller efficiency, and, for aircraft, increased thrust and lift, higher speeds, and increased factors of safety.

To the aforesaid primary ends, other and more specific objects of the invention as applied to aircraft are to modify and amplify the slip-stream action to afford increased lift and to thereby make higher altitudes possible; to reduce the required extended wing area of heavier-than-air craft and thereby to reduce drag; to reduce flat face resistance; to permit use of propellers of relatively small radius and the efficient operation of propellers at higher speeds; to provide a plurality of selective effective airplane controls less liable to failure; to afford a greater structural factor of safety; to reduce the side-slipping characteristics of airplanes; and to afford relatively great longitudinal stability and generally better control of airplanes when the motor is inoperative.

In the attached drawings:

Figure 1 is a diagrammatic sectional view illustrating the principle of my invention, and Figs. 2, 3, 4 and 5 are, respectively, front and side elevation, and top and inverted plan views of an airplane incorporating the invention.

As illustrated in Fig. 1, my invention contemplates the use of a substantially tubular structure I of novel form which in assembly is located rearwardly of and substantially coaxially with the propeller 2. Characteristic features of the structure I are the tubular form of its leading end and the rearward extension of the upper portion of this leading end to provide the substantially semi-tubular trailing end. In a preferred embodiment the overhanging portion 3 of the structure I exceeds substantially in length the leading tubular portion, and the diameter of the leading end of the structure substantially equals the diameter of the propeller-disk area so that substantially the entire slip-stream is confined within the structure.

In a preferred embodiment of my invention, the upper portion of the structure I including the overhanging trailing portion is substantially uniform in wall thickness with rounded leading edge and sharpened trailing edge, and this portion of the structure is slightly cambered in the longitudinal direction and extends substantially parallel to the tubular axis. At the forward end, the wall thickness of the upper portion of the structure gradually increases to merge with the lower portion 4 of the tube, which possesses longitudinally a cross section of a typical airfoil.

In the illustrated embodiment of my invention, this airfoil corresponds to the Clark Y-15 and is arranged at the bottom of the tube at an angle of attack of about 6°, thereby affording a diameter at the rear of the tubular portion somewhat in excess of that at the leading end and a throat restriction in the interior of this portion about one-third the axial length of this portion from the leading end.

I have discovered that with a tubular structure of this general character located as described with respect to the propeller, and at suitably high propeller speeds a true vortex may be developed by the propeller action within the forward or completely tubular end portion, and it is one of the functions of this tubular forward end portion to generate this vortex. I have discovered further that this vortex disintegrates in the area adjoining the rear end of the forward tubular section of the structure I, and that in this disintegration the dynamic force created by the propeller is converted into a static energy exerted assembly in advance of the leading edge of the upper extended portion of the structure. The structure is designed to control the formation and disintegration of the vortex, so that the static energy released by such disintegration may act to best advantage.

As stated above, the propeller is located in the assembly in advance of the leading edge of the tubular structure, and preferably, and as illustrated, the propeller is spaced from said leading edge to an extent equal approximately to one-fourth of the diameter of the propeller disk area. When, as described, the propeller is driven at a speed sufficient to convert the slip-stream flow into the power movement of a true vortex,—a speed say of 6000 R. P. M. in the case of an assembly employing a propeller having a disk area diameter of 17", and greater or lesser as the size of the propeller required by the assembly is decreased or increased,—there is set up within the tube, probably as a result of the condensation of the propeller slip-stream air in the vortex and the high linear velocity of the latter, a condition which causes large volumes of air to be inducted into the front end of the tube through the annular space between the periphery of the propeller disk and the edge of the tube. This inducted air is in addition to the normal propeller slip-stream which, in the form of assembly illustrated, is entirely embraced by the tube, so that the entire volume of air displaced through the tube by the propeller action is very greatly in excess of the volume representing the normal capacity of the propeller at the same speed and uncombined with the tubular structure.

The normal slip-stream of a propeller shows a convergent cone immediately behind the propeller which rapidly changes into a cone of divergence. When the tubular structure is arranged as described with respect to the propeller, the leading end of the structure encircles the propeller slip-stream within the area of said convergent cone, and the inner surface contour at the bottom of the forward end of the structure as viewed in Figure 1 conforms approximately to the contour of the normal slip-stream of a propeller operated at a conventional propeller speed. The axial contour of the inner surface of that side of the structure which includes the overhanging trailing end conforms, on the other hand, to the contour of the whole body of air passing through the tube, and there is accordingly substantial freedom from turbulence over this surface.

This tubular structure under test and through a wide range of angle of attack displays in itself favorable lift and drag characteristics. With the propeller in operation these characteristics are improved to a marked degree. This improvement in lift and drag characteristics is derived primarily from the controlled and modified slip-stream action described above, which action is distinct from that controlling the corresponding characteristics of a wing of given airfoil section wherein the lift is derived from vacuum formed above the wing.

In its application to airplanes, the invention affords material advantages over the standard construction. By modifying the propeller slip-stream as described, the limitations of the airfoil wing can to a large extent be avoided. Landing speeds, for example, may be materially reduced, since the lift is not solely dependent upon the efficiency of the airfoil wing as in the present standard airplane design. Similarly, my invention permits flight at higher altitudes than is obtainable by the usual airplane design, since the ceiling is not determined solely by vacuum lift and is therefore not affected in the same degree by the rarefied atmospheres met at the higher altitudes. The increased lift obtainable by my invention also permits increased rate of climb, a feature that is aided by the fact that the lift of the tubular structure reaches a maximum at an angle of attack materially greater than that at which the lift of an airfoil wing begins to decline.

In an airplane incorporating my invention, the great lift obtained in the propeller assembly makes possible a substantial reduction in wing area with a consequent corresponding decrease of induced drag due to the wings. While there is some induced drag in the tubular structure of the assembly, this drag is relatively small as compared with the drag decrease effected by reduction of wing and flat face resistance. This reduction in total drag makes possible materially increased speeds of flight, and this characteristic is further aided by the improved propeller performance previously mentioned, and ability to operate the propeller efficiently at higher speeds of rotation.

The propeller assembly makes possible a dual system of control adding materially to safety of flight. It is possible, for example, to separate the slip-stream from the conventional control and to provide an entirely independent control confined to the controlled slip-stream area. In Fig. 1 of the drawings, I show such a control in the form of an airfoil 5 at the back of the tubular structure 1. This control may be constituted to function as a simple stabilizer, an elevator, an aileron, or as a combination of two or more of these elements. In the embodiment of my invention shown in Figs. 2 to 5, inclusive, the conventional controls are located outside of the controlled slip-stream area, and the airfoils 5 at the rears of the respective propeller assemblies provide within the slip-stream area an independent set of controls capable of controlling flight of the airplane in the event of failure of the conventional controls, or as the principal or auxiliary control means. I have found that controls thus confined to a controlled slip-stream are capable of functioning efficiently under conditions where the conventional controls do not adequately respond.

The additional lift obtained through use of my assembly also affords an increased safety factor not only by assisting at the takeoff in getting the ships quickly into a safely maneuverable position, but also by permitting better and stronger aircraft construction. The assembly exerts a definite directional force affording exceptional longitudinal stability and freedom from side-slip. In the event of the motor cutting out, the tubular structure provides a centralized area of air pressure affording a definite parachute action.

In the drawings, I have shown the engine nacelle 6 mounted in the front of the tubular structure 1, but this arrangement of the power source is not essential to the assembly, and it may be placed in a position remote to the propeller assembly. It will be understood also that the propeller assembly has useful application to all known types of aircraft and is not limited to airplanes nor to the specific airplane construction illustrated in the drawings. It will be further understood that the invention is not limited to the specific form of the substantially tubular structure disclosed, and that there may be modification in this respect without departure from the invention as defined in the appended claims.

I claim:

1. An aero-dynamic device comprising in combination a propeller, and a tubular structure spaced rearwardly from and substantially concentric with the propeller, said structure having a tubular leading portion constructed and arranged with respect to the propeller to receive the entire propeller slip-stream, and having a semi-tubular trailing portion, the interior surface of said structure at the side which includes said trailing portion having an axial cross sectional contour approximately paralleling the tubular axis, and having at the opposite side of the tube a contour conforming substantially to the upper surface of a typical airfoil section, said latter contour being disposed angularly with respect to the tubular axis with the leading edge of said contour closer to said axis than the trailing edge thereof, thereby slightly increasing the area of the rear end of the tubular leading portion over that of the forward end, and said contours merging smoothly one into the other at the sides of said tubular portion.

2. An aero-dynamic device comprising in combination a propeller, and a tubular structure spaced rearwardly from and substantially concentric with the propeller, said structure having a tubular leading end and a semi-tubular trailing end and being constructed and arranged with respect to the propeller to receive the entire propeller slip-stream and to convert the flow of said slip-stream into the power movement of a true vortex, the space between the periphery of the propeller disk area and the leading edge of said structure affording access for flow of air induced by said vortex to the interior of the structure in addition to the normal propeller slip-stream.

3. An aero-dynamic device comprising in combination a propeller, and a tubular structure spaced rearwardly from and substantially concentric with the propeller, said structure having a tubular leading end and a semi-tubular trailing end and being constructed and arranged with respect to the propeller to receive the entire propeller slip-stream and to convert the flow of said slip-stream into the power movement of a true vortex, said tube being symmetrical with respect to an axial plane bisecting said trailing end, and the diametrical section defined by said plane exhibiting an inner surface contour at the side which includes the trailing end extending approximately parallel to the tubular axis and affording a flow of air over that portion of the inner surface of the tube substantially free from turbulence, and the inner surface contour at the other side of said diametrical section conforming substantially to the upper surface of a typical airfoil section and being disposed with respect to the tubular axis so as to slightly increase the area of the rear end of the said tubular leading portion over that of the forward end, and said contours merging smoothly into each other at opposite sides of said axial plane.

4. An aero-dynamic device comprising in combination a propeller, and a tubular structure spaced rearwardly from and substantially concentric with the propeller, said structure having a tubular leading end and a semi-tubular trailing end and being constructed and arranged with respect to the propeller to receive the entire propeller slip-stream and to convert the flow of said slip-stream into the power movement of a true vortex, said tube being symmetrical with respect to an axial plane bisecting said trailing end, and the diametrical section defined by said plane exhibiting an inner surface contour at the side which includes the trailing end extending approximately parallel to the tubular axis and affording a flow of air over that portion of the inner surface of the tube substantially free from turbulence, and the inner surface contour at the other side of said diametrical section conforming substantially to a normal slip-stream contour of said propeller, and said contours merging smoothly into each other at opposite sides of said axial plane.

5. In combination, a propeller and a tubular structure positioned at the rear of and in axial alignment with said propeller, the forward tubular end of the structure forming a circle embracing the propeller slip-stream within the area of its convergence at the rear of the propeller, whereby said tube is adapted to receive said slip-stream in its entirety, said structure having a semi-tubular trailing end, the inner surface of said structure on an axial cross section extending through trailing end having a contour including the semi-tubular portion that approximately parallels the tubular axis, and the inner surface contour at the other side of said cross section being convexly curved and forming a restricting throat in the tubular leading portion of the structure relatively close to the leading end of the tubular portion, the diameter of said tubular portion being slightly greater at the rear end than at the said leading end, and said contours merging smoothly into each other at opposite sides of the plane of said cross section.

6. In combination, a propeller, and a tubular structure positioned at the rear of and in axial alignment with said propeller, the forward tubular end of the structure forming a circle of diameter substantially the same as that of the propeller disk area and being spaced from the propeller at a distance approximately one-fourth of said diameter, said structure having a semi-tubular trailing end exceeding in length the tubular leading end and being adapted to convert the propeller slip-stream flow into the power movement of a true vortex, an axial cross section bisecting the said semi-tubular trailing end exhibiting an inner surface contour extending through said semi-tubular portion conforming substantially to the contour of the body of air passing through the tube, and at the opposite side of said section a contour conforming approximately to a normal propeller slip-stream contour.

7. In combination, a propeller, and a tubular structure positioned at the rear of and in axial alignment with said propeller, the forward tubular end of the structure forming a circle of diameter substantially the same as that of the propeller disk area and being spaced from the propeller at a distance approximately one-fourth of said diameter, said structure having a semi-tubular trailing end exceeding in length the tubular leading end and being adapted to convert the propeller slip-stream flow into the power movement of a true vortex, an axial cross section bisecting the said semi-tubular trailing end exhibiting an inner surface contour extending through said semi-tubular portion substantially parallel to the tubular axis and conforming to the contour of the whole body of air passing through the tube, and at the opposite side of said section a convexly curved contour approximating the upper surface of a typical airfoil section, said latter contour forming a restricting throat in the tubular leading end of the structure relatively close to the leading end of the tube and affording a diameter at the rear end of the tube in excess of that at the forward end, and said contours merging smoothly into each other at the opposite sides of said cross section.

8. An aero-dynamic device comprising in combination a propeller, and a tubular structure spaced rearwardly from and substantially concentric with the propeller, said structure having a tubular leading end and a semi-tubular trailing end and being constructed and arranged with respect to the propeller to receive the entire propeller slip-stream and to convert the flow of said slip-stream into the power movement of a true vortex, an engine for driving the propeller positioned immediately behind the latter, and a housing for said engine projecting into the forward end of said tube and shaped to conform substantially with the vortex cavity.

9. An aero-dynamic device comprising in combination a propeller, and a tubular structure spaced rearwardly from and substantially concentric with the propeller, said structure having a tubular leading end and a semi-tubular trailing end and being constructed and arranged with respect to the propeller to receive the entire propeller slip-stream and to convert the flow of said slip-stream into the power movement of a true vortex, means for driving said propeller, and means behind said propeller and projecting into the forward end of said tube shaped to conform substantially with the vortex cavity.

10. An aero-dynamic device for use in aircraft, said device comprising a propeller, a tubular structure arranged behind and in axial alignment with the propeller for reception of the propeller slip-stream and comprising a tubular leading end and an overhanging semi-tubular trailing end, the upper portion of said structure including the said trailing end extending substantially parallel to the tubular axis, and the lower portion of the tubular leading end having an axial cross section of a typical airfoil with an angle of attack affording a diameter at the rear end of the tube in excess of that at the forward end.

11. An aero-dynamic device for use in aircraft, said device comprising a propeller, a tubular structure arranged behind and in axial alignment with the propeller for reception of the propeller slip-stream and comprising a tubular leading end and an overhanging semi-tubular trailing end, said structure being constructed to convert the flow of said slip-stream into the power movement of a true vortex, the upper portion of said structure including the said trailing end being shaped to conform substantially to the contour of the whole body of air passing through the tube, and the lower portion of the tubular leading end having an axial cross section of a typical airfoil with an angle of attack affording a diameter at the rear end of the tube in excess of that at the forward end and a restricted throat adjacent said forward end.

12. An aero-dynamic device for use in aircraft, said device comprising a propeller and a tubular structure arranged behind and in axial alignment with the propeller for reception of the propeller slip-stream and comprising a tubular leading end and an overhanging semi-tubular trailing end, said structure being formed to convert the flow of said slip-stream into the power movement of a true vortex, the upper portion of said structure including the said trailing end being shaped to conform substantially to the contour of the whole body of air passing through the tube, and the lower portion of the tubular leading end having an axial cross section of a typical airfoil with an angle of attack affording a diameter at the rear end of the tube in excess of that at the forward end and a restricted throat adjacent said forward end, and the circular forward end of the structure corresponding in diameter substantially to the diameter of the propeller disk area and being spaced rearwardly from the latter at a distance of about one-fourth of said diameter.

13. A propeller assembly comprising a structure having a substantially tubular leading end and an overhanging substantially semi-tubular trailing end, the upper portion of said structure including the said trailing end extending substantially parallel to the tubular axis, and the lower portion of the leading end having an axial cross section of a typical airfoil with an angle of attack affording a greater diameter at the rear end of the said tubular leading end than at the front end, and a propeller mounted in coaxial position in advance of said leading end, the interior of said leading end at a point adjacent to but rearwardly of its forward extremity being somewhat smaller in diameter than the propeller disk area and being shaped to receive the entire propeller slip-stream.

RALPH K. ODOR.